United States Patent [19]

Ozaki et al.

[11] Patent Number: 5,171,638
[45] Date of Patent: Dec. 15, 1992

[54] ORGANOPOLYSILOXANE/ACRYLATE ESTER COPOLYMER EMULSION

[75] Inventors: Masaru Ozaki; Tsutomu Naganawa, both of Ichihara; Isao Ona, Kimitsu, all of Japan

[73] Assignee: Dow Corning Toray Silicone Co., Ltd., Tokyo, Japan

[21] Appl. No.: 733,784

[22] Filed: Jul. 22, 1991

[30] Foreign Application Priority Data

Aug. 2, 1990 [JP] Japan ................. 2-205605

[51] Int. Cl.$^5$ .................................... B32B 9/04
[52] U.S. Cl. .......................... 428/447; 524/806; 524/837; 524/866
[58] Field of Search ............ 524/806, 837, 866; 428/447

[56] References Cited

U.S. PATENT DOCUMENTS 4,987,180  1/1991  Ohata .................. 524/860

FOREIGN PATENT DOCUMENTS 834267   2/1970  Canada ................. 400/48
79005007 10/1977 Japan .
54-5007  3/1979  Japan .
01168972 7/1989  Japan .

Primary Examiner—Melvyn I. Marquis
Assistant Examiner—Karen A. Hellender
Attorney, Agent, or Firm—Alexander Weitz

[57] ABSTRACT

An organopolysiloxane/acrylate ester copolymer emulsion composition is prepared by forming a water-based emulsion of an alkenyl-containing organopolysiloxane containing no more than 5,000 parts per million of organosiloxane oligomer which has $\leq 20$ silicon atoms in its molecule and copolymerizing the emulsion with an acrylate ester monomer. The resultant copolymer does not suffer from disadvantages of prior art systems, such as staining in applications as a paint or water repellent, staining in fiber treatment applications, or reduction of adhesion when the copolymer is used as a release coating.

14 Claims, No Drawings

ORGANOPOLYSILOXANE/ACRYLATE ESTER COPOLYMER EMULSION

The present invention relates to an organopolysiloxane/acrylate ester copolymer emulsion having a reduced content of organosiloxane oligomer.

BACKGROUND OF THE INVENTION

Acrylate ester polymers have been widely employed for coatings and fiber treatment due to their excellent film-forming properties, stain resistance, and weather resistance. However, due to their poor moisture permeability and water repellency, and particularly within the sphere of their application as coatings for concrete, autoclaved light-weight concrete (ALC), or various other types of exterior building walls, cracking may occur due to moisture permeation; or deformation and cracking may occur at clad seams or joints due to the expansion and contraction deriving from water absorption by the exterior wall material; or dew condensation may occur in winter due to the lack of moisture permeability. In order to provide improvement in this regard, organopolysiloxane/acrylate ester copolymer emulsions, which are equipped with water repellency and moisture permeability, have already been proposed and are widely employed for paints, coatings, and fiber and textile treatment (refer to Japanese Patent Publication Number 52-12231 [12,231/77], Japanese Patent Publication Number 54-5007 [5,007/79], Japanese Patent Application Laid Open Number 01-168971 [168,971/89], and Japanese Patent Application Laid Open Number 01-168972[168,972/89]). In this prior art, after the emulsion polymerization of vinylic group-substituted cyclosiloxane, unsaturated group-containing organic monomer is added directly to this emulsion, for example, as in Japanese Patent Publication Number 52-12231, and radical polymerization is then carried out. This method is generally associated with organosiloxane oligomer contents of 20,000 to 150,000 parts per million (ppm) by weight, wherein the oligomer contains $\leq 20$ silicon atoms, designated by "$Si_{\leq 20}$" hereinafter. Otherwise, as described in Example 1 of Japanese Patent Application Laid Open Number 01-168971, octamethylcyclotetrasiloxane and methacryloxypropylmethylsiloxane are first emulsion polymerized, and the volatile siloxane is then removed by steam distillation. Nevertheless, the content of $S_{\leq 20}$ organosiloxane oligomer is still generally at least 10,000 ppm by weight. In the case of coating applications, the presence of such large titers of $Si_{\leq 20}$ organosiloxane oligomer is associated with organosiloxane oligomer bleed onto the surface of the paint film with the passage of time. This results in the adhesion of dust and soot and a strong tendency toward staining of the paint film's surface. Moreover, in the case of application as a fiber/textile treatment agent, evaporation of the organopolysiloxane oligomer within heat-treatment devices poses the risk of fire and explosion. This evaporated material also condenses and collects as oil droplets, which drip onto and stain the textile product. In addition, it ultimately decomposes into silicon dioxide, which becomes mobilized and dispersed and itself also blemishes the textile product. In the case of use as a release agent for release paper or release liner, the organosiloxane oligomer migrates into the product and subsequently impairs adhesiveness.

SUMMARY OF THE INVENTION

The present invention takes as its object a solution to the preceding problems through the introduction of an organopolysiloxane/acrylate ester copolymer emulsion which in its application to textile and fiber treatment, does not lead to blemishing by oil spots or silicon dioxide; in its application to paints and coatings, does not lead to the adhesion of stains or dirt to the surface of the paint film; and in its application as a release agent for release paper or release liner, does not adversely affect the adhesiveness or other properties.

The aforesaid object is achieved by an organopolysiloxane/acrylate ester copolymer emulsion which is characterized by the copolymerization, in the presence of a radical polymerization initiator, of a mixture prepared from (I) 100 weight parts of an emulsion prepared from
  (A) 100 weight parts organopolysiloxane which has at least 2 silicon-bonded alkenyl groups in each molecule and which contains $\leq 5,000$ ppm of organosiloxane oligomer having 20 or fewer silicon atoms,
  (B) 50 to 5,000 weight parts water, and
  (C) 1 to 50 weight parts emulsifying agent,
(II) 0.1 to 100 weight parts of an acrylate ester monomer.

DETAILED DESCRIPTION OF THE INVENTION

To explain the preceding in greater detail, the organopolysiloxane comprising the component (A) is the most important component of the present invention. While component (A) is preferably a straight chain, it may be partially branched or network or cyclic. It must contain at least 2 silicon-bonded alkenyl groups in each molecule. The position of the alkenyl groups in the molecular structure is not specifically restricted, and they may be present only at the two molecular chain terminals, only as side chains, or both at the molecular chain terminals and as side chains. This organopolysiloxane should have a viscosity at 25 degrees Centigrade of about 50 to 100,000 centistokes and preferably of 100 to 20,000 centistokes.

The alkenyl group which must be bonded to silicon in this organopolysiloxane is exemplified by vinyl, allyl, and hexenyl, vinyl being preferred among these. The other silicon-bonded organic groups are exemplified by alkyl groups such as methyl, ethyl, butyl, hexyl, and octyl; by aryl groups such as phenyl; and by substituted hydrocarbon groups such as the 3,3,3-trifluoropropyl group. The methyl group is preferred among these (i.e., the organopolysiloxane is polydimethylsiloxane).

The most important condition placed on component (A) is that this organopolysiloxane must contain no more than about 5,000 ppm $Si_{\leq 20}$ organosiloxane oligomer (i.e., an oligomer having no more than 20 silicon atoms in its molecule). This is because the effects of the present invention are not obtained to a satisfactory degree when the 5,000 ppm limit is exceeded. The organosiloxane oligomer consists mainly of a mixture of $Si_{\leq 20}$ cyclic dimethylpolysiloxane, $Si_{\leq 20}$ cyclic methylvinylpolysiloxane, $Si_{\leq 20}$ linear dimethylpolysiloxane, $Si_{\leq 20}$ linear methylvinylpolysiloxane, and $Si_{\leq 20}$ linear dimethyl-methylvinylpolysiloxane. In addition, depending on the type of organopolysiloxane, oligomer analogous to the preceding may be present in which the ethyl group, phenyl group, and the like is substituted into the aforementioned organopolysiloxane. It is preferred that this organosiloxane oligomer be present at no more than 2,000 ppm and it is most preferred that it be present at no more than 500 ppm. In order to obtain an organopolysiloxane (A) having less than 5,000 ppm $Si_{\leq 20}$ organosiloxane oligomer, for example, the product from equilibration polymerization is first stripped in order to reduce the $Si_{\leq 20}$ organosiloxane oligomer to approximately 10,000 to 40,000 ppm. This is followed by removal of the organosiloxane oligomer fraction by further treatment at high temperatures under a high vacuum, for example, at 150 to 350 degrees Centigrade and 0.01 to 20 mmHg, using a thin-film evaporator. The organosiloxane oligomer fraction can also be removed by extraction using an alcohol (e.g., methanol, ethanol, n-butanol, isopropanol), ketone (e.g., acetone, methyl ethyl ketone), or a mixed solvent of the preceding with hexane, benzene, toluene, xylene, inter alia. These methods can also be used in combination. While it will generally be sufficient to use thin-film evaporation or organic solvent extraction, one should resort to the combined use of thin-film evaporation and organic solvent extraction when a maximal organosiloxane oligomer depletion is desired. This organopolysiloxane possessing at least 2 alkenyl groups in each molecule, after having had its $Si_{\leq 20}$ organosiloxane oligomer titer depleted to no more than about 5,000 ppm under these rigorous conditions, is then emulsified to form the emulsion component (I). This is accomplished by mixing water (B) and emulsifying agent (C) in an emulsifier such as a homomixer, colloid mill, line mixer, homogenizer, or the like. Component (B) is used at about 50 to 5,000 weight parts per 100 weight parts component (A) and component (C) is used at about 1 to 50 weight parts per 100 weight parts component (A), but the mixing proportions for each of the components in the emulsion will vary with the intended application and may be determined by routine experimentation. The organopolysiloxane content in the emulsion is generally 5 to 65 weight %, and the general-purpose range is 20 to 40 weight %.

No specific restrictions are placed on the type of emulsifying agent comprising component (C), and the following are provided by way of example: nonionic surfactants, such as polyoxyalkylene alkyl ethers, polyoxyalkylene alkylphenol ethers, polyoxyalkylene alkyl esters, sorbitan alkyl esters, polyoxyalkylene sorbitan alkyl esters, polyethylene glycols, and polypropylene glycols; anionic surfactants, such as sodium lauryl sulfate, sodium dodecylbenzensulfonate, the salts of sulfate esters of polyoxyethylene monoalkyl ethers, and the salts of alkylnaphthylsulfonic acids; and cationic surfactants, as exemplified by the quaternary ammonium hydroxides such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, beef tallow trimethylammonium hydroxide, cocotrimethylammonium hydroxide, and salts of the preceding. Combinations of nonionic surfactant and anionic surfactant may also be employed.

The emulsion comprising component (I) is then heated to 80 to 80 degrees Centigrade. Free radical polymerization initiator is added, the acrylate ester monomer comprising component (II) is dripped in while stirring, and the target organopolysiloxane/acrylate ester copolymer is obtained by polymerization for about 5 to 8 hours. The free radical polymerization initiator deployed here is exemplified by ammonium persulfate, potassium persulfate, hydrogen peroxide, azobisisobutyronitrile, dibutyl peroxide, and benzoyl peroxide.

The acrylate ester monomer comprising component (II) is exemplified by methyl acrylate, ethyl acrylate, butyl acrylate, octyl acrylate, methyl methacrylate, ethyl methacrylate, propyl methacrylate, butyl methacrylate, octyl methacrylate, 2-ethylhexyl methacrylate, hydroxyethyl methacrylate, and so forth. Within the present context, the acrylate ester also encompasses mixtures made up mainly of those compounds exemplified above along with minor amounts of acrylic acid, methacrylic acid, acrylamide, acrylonitrile, styrene, vinyl chloride, alpha-methylstyrene, vinyl acetate, vinyltrialkoxysilane, vinyltriacetoxysilane, and gamma-methacryloxypropyltrimethoxysilane.

Component (II) is added within the range of about 0.1 to 100 weight parts acrylate ester monomer per 100 weigth parts emulsion component (I), and preferably at 25 to 125 weight % of the weight of organopolysiloxane (A) present in the emulsion.

As necessary or desired, the emulsion according to the present invention may also contain an organopolysiloxane oil emulsion, an organopolysiloxane resin emulsion, silane coupling agent, pigments, paints, antiseptics, fillers, thickeners, sizes, and anti-rust agents. The organopolysiloxane/acrylate ester copolymer emulsion according to the present invention has an excellent film-formability, weather resistance, water repellency, stain resistance, and moisture permeability, and may be utilized to coat various substrates. For example, it may be employed as a textile treatment agent for knits, weaves, nonwovens, etc.; as a paint or coating for ALC, exterior wall panels, concrete constructions, roofs, bridges, roads, streets, highways, and so forth; and as a release agent for release paper, release liner, and so forth. Moreover, because the emulsion according to the present invention has been strongly depleted of $Si_{\leq 20}$ organosiloxane oligomer, the following problems have also been eliminated: oil spot staining in application as a textile or fiber treatment agent, the pronounced tendency for staining of the film surface in applications as a paint or coating, and the poor adhesiveness in applications as a release agent for process or working paper.

EXAMPLES

The present invention is explained in greater detail below through illustrative examples, in which parts=weight parts, %=weight %, and the viscosity is the value at 25 degrees Centigrade. The content of $Si_{\leq 20}$ organosiloxane oligomer was measured by gas chromatography.

EXAMPLE 1

This example concerns the preparation of three emulsions of vinyl-containing organopolysiloxane, each with a different content of $Si_{\leq 20}$ organosiloxane oligomer. Each emulsion was then copolymerized with acrylate ester monomer in order to prepare the respective organopolysiloxane/acrylate ester copolymer emulsions.

Emulsion A (present invention)

Thirty-three parts organopolysiloxane oil with the following formula

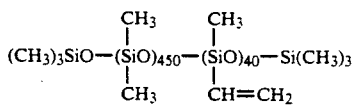

which had been treated in a thin-film evaporator at 280 degrees Centigrade/1.75 torr (viscosity=3,550 centistokes, contained 1,380 ppm organosiloxane oligomer consisting mainly of $Si_{\leq 20}$ cyclic and linear dimethylsiloxane oligomer and methylvinylsiloxane oligomer), 3.0 parts polyoxyethylene (6 ml) lauryl ether as nonionic surfactant, 0.3 parts sodium polyoxyethylene (5 mol) laurylsulfonate, and 63.7 parts water were converted into an organopolysiloxane emulsion using a colloid mill emulsifier. 350 Parts of this emulsion was then transferred into a three-neck flask, the temperature was brought to and maintained at 85 degrees Centigrade ±3 degrees Centigrade, 1 part ammonium persulfate was added, and a mixed solution of 50 parts methyl acrylate, 6 parts methacrylic acid, 2 parts hydroxyethyl methacrylate, and 2 parts acrylic acid was gradually dripped in from an addition funnel. After the completion of addition, polymerization was conducted by maintaining the temperature at 90 degrees Centigrade ±3 degrees Centigrade for 6 hours. The product was an organopolysiloxane/acrylate ester copolymer emulsion which was designated as emulsion A.

Emulsion B (comparison example)

An emulsion was prepared under the same conditions as for emulsion (A), but in this case using the aforementioned organopolysiloxane oil without treatment in a thin-film evaporator (viscosity=3,420 centistokes, contained 36,500 ppm organosiloxane oligomer consisting mainly of $Si_{\leq 20}$ cyclic and linear dimethylsiloxane oligomer and methylvinylsiloxane oligomer). An organopolysiloxane/acrylate ester copolymer emulsion (emulsion B) was then prepared by the addition of acrylate ester monomer again as for emulsion (A).

Emulsion C (comparison example)

Twenty-nine parts octamethyltetracyclosiloxane, 3 parts methylvinyltetracyclosiloxane, 1 part $(CH_3)_3SiO\{(CH_3)_2SiO\}_{12}Si(CH_3)_3$ as chain blocker, 2 parts dodecylbenzenesulfonic acid, and 65 parts water were stirred to homogeneity and passed twice through an homogenizer emulsifier at a pressure of 400 kg/cm$^2$. This was then transferred to a three-neck flask, and polymerization was conducted by heating to 85 degrees Centigrade and holding there for 90 minutes, then maintenance at 45 degrees Centigrade for 6 hours. This was followed by neutralization with 1 part triethanolamine to afford the organopolysiloxane emulsion. An organopolysiloxane oil was recovered by acetone extraction after breaking the emulsion: it had a viscosity of 2,750 centistokes and contained 109,500 ppm organosiloxane oligomer consisting mainly of $Si_{\leq 20}$ cyclic and linear dimethylsiloxane oligomer and methylvinylsiloxane oligomer. This organopolysiloxane emulsion was used to prepare an organopolysiloxane/acrylate ester copolymer emulsion (emulsion C) under the same conditions as for emulsion (A).

(1) Preliminary testing

Three mL of each of the emulsions A, B, and C thus obtained was respectively introduced into each of 3 aluminum dishes and allowed to stand for two 24-hour periods at room temperature. Each of these formed an almost transparent film which was so strongly bonded to the aluminum dish that it could not be peeled therefrom. Very tough, highly adhesive, and very lustrous organopolysiloxane/acrylate ester copolymer films were formed.

(2) Emulsion stability

One hundred mL of each emulsion was introduced into a 200 mL bottle, and the high-temperature stability was evaluated by immersion for 3 weeks at 50 degrees Centigrade. The long-term stability was also similarly evaluated by standing for 6 months at 25 degrees Centigrade. The obtained results are reported in Table 1.

(3) Staining resistance test

Three aluminum plates (200×200×2 mm) which had been coatd with a commercial white house paint (alkyd resin) were prepared, and a surface treatment was conducted by spraying emulsion A, B, or C, respectively, on these 3 aluminum plates using a spray gun. After standing at room temperature for one 24-hour period, a smooth, slippery film was formed on the surface of the aluminum plate in each case. These three aluminum plates were hung from the eaves of a building (avoiding exposure to rain) in a factory district, and the staining on their surfaces was evaluated after 3 and 7 months. The obtained results are reported in Table 1.

(4) Oligomer transfer test based on residual adhesive force

Emulsions A, B, and C were each homogeneously coated on glassine paper using a No. 20 wire bar and were dried by standing for one 24-hour period. Cellophane tape was adhered on the coated surface in each case, a load of 30 g/cm$^2$ was overlaid, and the cellophane tape was peeled off after 24 hours. In each case the cellophane tape was then adhered on a clean aluminum plate (50×150×2 mm), and the peeling force A (g) was determined after 10 hours using a Tensilon tensile tester at a speed of 30 cm/minute. For the blank, the cellophane tape was directly applied to the aluminum plate and the peeling force B (g) was determined. The residual adhesive force (%) was then determined from the following equation. The reported value is the average of 5 executions of the test.

residual adhesive force $(\%) = (A/B) \times 100$

A larger value for the residual adhesive force (%) indicates a smaller transfer of organosiloxane oligomer. The obtained results are reported in Table 1.

TABLE 1

| | | Present invention (emulsion A) | Comparison example emulsion B) | Comparison example (emulsion C) |
| --- | --- | --- | --- | --- |
| Emulsion Stability | 25° C. | No change after 6 months | No change after 6 months | No change after 6 months |
| | 50° C. | Stable after 3 weeks | Stable after 3 weeks | Stable after 3 weeks |
| Resistance To Staining | after 3 months | Absolutely no staining | Slight black staining | Moderate black staining |
| | after 7 months | Absolutely no staining | Moderate staining | Fairly substantial staining |
| Residual adhesive force (%) | | 76 | 43 | 32 |

TABLE 1-continued

|  | Present invention (emulsion A) | Comparison example emulsion B) | Comparison example (emulsion C) |
| --- | --- | --- | --- |
| Comprehensive evaluation of performance | Excellent | Unsatis. | Unsatis. |

Emulsions A, B, and C each evidenced an excellent emulsion stability both at high temperatures (50° Centigrade) and at room temperature (25° Centigrade). However, when the results from the staining resistance test (application to building material as a paint or water repellent) are reviewed, one finds that the present invention gave excellent results in that very little staining was picked up even in long-term use, while the comparison examples picked up a fairly heavy stain. The difference from the present invention was substantial. Moreover, there was less transfer by organosiloxane oligomer in the present invention than in the comparison examples, and the residual adhesive force was therefore quite excellent in the case of the former. This is indicative of its suitability for application as a release agent for release paper, etc. The preceding results support an evaluation to the effect that the emulsion according to the present invention, which has been depleted of organosiloxane oligomer, is much better suited for application as a paint, water repellent, and release agent than are the comparison examples.

EXAMPLE 2

Paper sheet for packing gaskets (250×20×1 mm) was immersed for 10 minutes in emulsion A, B, or C as prepared in Example 1, withdrawn, dried in an air current for 15 hours, and then heat treated for 10 minutes at 150 degrees Centigrade. Using an Instron tensile tester, the dry tensile strength (g) and wet tensile strength (g) were measured at a traction rate of 30 cm/minute. As a comparison example, the tensile strength was similarly measured on gasket packing paper sheet which had not been treated as above. In another experiment, for each type of gasket packing paper sheet treated with emulsion A, B, or C, 200 sheets were dried at room temperature, then placed in a clean minijet oven (heated with nichrome wire, interior=width 30 cm, depth 30 cm, height 25 cm) and heat treated at 200 degrees Centigrade for 20 hours. There was no mixing of the types during the heat treatment. After completion of the heat treatment, the oven was inspected for staining of its ceiling and for silica adhesion to the surface of the nichrome heating wire. These results are reported in Table 2. Due to its substantially improved dry and wet tensile strengths, emulsion A (present invention) is ideal for use as a textile/fiber binder, while the absence of contamination of the heating devices used in textile/fiber treatment make emulsion A ideal as a general textile treatment agent.

TABLE 2

|  | Present Invention Emulsion A | Comparison Examples | | |
| --- | --- | --- | --- | --- |
|  |  | no treatment | Emulsion B | Emulsion C |
| Dry tensile strength (g) | 114 | 41 | 103 | 95 |
| Wet tensile strength (g) | 83 | 3 | 77 | 72 |
| Ceiling staining in the minijet oven | Completely absent | — | Light staining over entire ceiling, slight oligomer adhesion | Light staining over entire ceiling, slight oligomer adhesion |
| Silica on the nichrome wire | Completely absent | — | Faint silica adhesion | Slight silica adhesion |
| Evaluation for fiber/textile treatment applications | Excellent | — | Unsatisfactory | Unsatisfactory |

EXAMPLE 3

A vinyl-substituted organopolysiloxane oil with a viscosity of 2,130 centistokes and the following formula

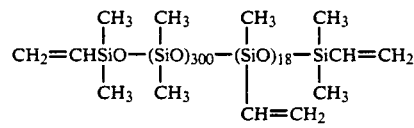

(contained 19,300 ppm organosiloxane oligomer consisting mainly of $Si_{\leq 20}$ cyclic and linear dimethylsiloxane oligomer and methylvinylsiloxane oligomer) and ethyl alcohol were vigorously shaken together (proportion = 1 part: 3 parts, respectively) for 30 minutes in a separatory funnel. This was followed by quiescence for 60 minutes in order to extract the organosiloxane oligomer which eluted into the ethyl alcohol layer. This procedure was carried out three times. The ethanol was finally removed in its entirety by heating to 130 degrees Centigrade in vacuo. After this extraction treatment, the vinyl-substituted organopolysiloxane contained 336 ppm organosiloxane oligomer consisting mainly of $Si_{\leq 20}$ cyclic and linear dimethylsiloxane oligomer and methylvinylsiloxane oligomer. The vinyl-substituted organopolysiloxane thus prepared was then emulsified as in Example 1. An organopolysiloxane/acrylate ester copolymer emulsion was prepared again as in Example 1, but in the present case adding a liquid mixture consisting of 5 parts methyl acrylate, 50 parts ethyl acrylate, and 5 parts ethyl methacrylate. This emulsion according to the present invention was designated as emulsion D.

For comparison, emulsification and preparation of the organopolysiloxane/acrylate ester copolymer emulsion were carried out under precisely the same conditions as above, except that the vinyl-substituted organopolysiloxane had not been subjected to the ethanol extraction treatment. This was designated as emulsion E (comparison example).

Emulsions D and E were each diluted twofold by the addition of water. The entire surface of a light-weight porous concrete panel (30×30×5 cm) was then sprayed with one of these dilutions using a spray gun. After standing at room temperature for one 24-hour period, each panel was maintained on the roof of a building for 7 months, and the water repellency and staining were then evaluated. An untreated panel was also tested for comparison. The water repellency was evaluated after a one-minute shower. These results are reported in Table 3. The light-weight porous concrete treated with emulsion A (present invention) had a far better water repellency after 7 months than did the comparison examples: the water droplets were beaded up into spheres, and there was absolutely no water permeation into the interior. Moreover, there was no staining or stain permeation and the original aesthetics were retained.

TABLE 3

|  | Water repellency after 7 months | Staining after 7 months |
| --- | --- | --- |
| Present invention (emulsion D) | Water permeation completely absent, water droplets beaded on surface like spheres | No adhesion or infiltration by stains, original aesthetics maintained |
| Comparison example (no treatment) | Surface is wetted, substantial water infiltration, water repellency entirely absent | Faint black staining over the entirety, prominent streak staining, substantial dust uptake |
| Comparison example (emulsion E) | No water infiltration, water droplets beaded on the surface like spheres | Stain adhesion and infiltration are slight, but entire object is slightly blackened |

That which is claimed is:

1. An organopolysiloxane/acrylate ester copolymer emulsion composition prepared by copolymerizing, in the presence of a free-radical polymerization initiator, a mixture consisting essentially of:
   (I) 100 weight parts of an emulsion prepared from
      (A) 100 weight parts of an organopolysiloxane which has at least 2 silicon-bonded alkenyl groups in each molecule and which contains ≦5,000 parts per million by weight of organosiloxane oligomer having 20 or fewer silicon atoms,
      (B) 50 to 5,000 weight parts water, and
      (C) 1 to 50 weight parts of an emulsifying agent; and
   (II) 0.1 to 100 weight parts of an acrylate ester monomer.

2. The composition according to claim 1, wherein said organopolysiloxane (A) is polydimethylsiloxane.

3. The composition according to claim 2, wherein the alkenyl groups of said organopolysiloxane (A) are vinyl groups.

4. The composition according to claim 3, wherein said organopolysiloxane (A) contains less than 2,000 parts per million by weight of said organosiloxane oligomer.

5. The composition according to claim 4, wherein said organopolysiloxane (A) contains less than 500 parts per million by weight of said organosiloxane oligomer.

6. The composition according to claim 2, wherein said acrylate ester monomer (II) comprises at least one compound selected from the group consisting of methyl acrylate, ethyl acrylte, butyl acrylate, octyl acrylate, methyl methacrylate, ethyl methacrylate, propyl methacrylate, butyl methacrylate, octyl methacrylate, 2-ethylhexyl methacrylate and hydroxyethyl methacrylate.

7. The composition according to claim 4, wherein said acrylate ester monomer (II) comprises at least one compound selected from the group consisting of methyl acrylate, ethyl acrylate, butyl acrylate, octyl acrylate, methyl methacrylate, ethyl methacrylate, propyl methacrylate, butyl methacrylate, octyl methacrylate, 2-ethylhexyl methacrylate and hydroxyethyl methacrylate.

8. A substrate coated with the composition of claim 1.

9. A substrate coated with the composition of claim 2.

10. A substrate coated with the composition of claim 3.

11. A substrate coated with the composition of claim 4.

12. A substrate coated with the composition of claim 5.

13. A substrate coated with the composition of claim 6.

14. A substrate coated with the composition of claim 7.

* * * * *